J. A. STOCKWELL.

TOE PROTECTORS FOR BOOTS AND SHOES.

No. 6,927. Reissued Feb. 15, 1876.

WITNESSES

Wm A Skinkle

Baltis D. Long.

INVENTOR

John A Stockwell.

By his Attorney Marcus S. Hopkins.

N. PETERS, PHOTO-LITHOGRAPHER, WASHINGTON, D. C.

UNITED STATES PATENT OFFICE.

JOHN A. STOCKWELL, OF BOSTON, MASSACHUSETTS, ASSIGNOR, BY MESNE ASSIGNMENTS, TO THE STOCKWELL SHOE-TIP COMPANY, OF CONN.

IMPROVEMENT IN TOE-PROTECTORS FOR BOOTS AND SHOES.

Specification forming part of Letters Patent No. 147,579, dated February 17, 1874; reissue No. 6,123, dated November 3, 1874; reissue No. 6,927, dated February 15, 1876; application filed January 28, 1876.

*To all whom it may concern:*

Be it known that I, JOHN A. STOCKWELL, of Boston, Suffolk county, and State of Massachusetts, have invented certain new and useful Improvements in Boots and Shoes; and I do hereby declare that the following is a full, clear, and exact description thereof, that will enable others skilled in the art to which it appertains to make and use the same, reference being had to the accompanying drawings and to the letters of reference marked thereon, which form a part of this specification.

My invention relates to toe-guards or tips for boots and shoes; and consists in forming a guard or tip from a single piece of any suitable material, so that it will protect the upper, as is hereinafter more particularly set forth.

Figure 1:
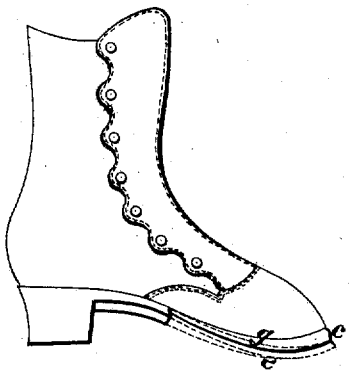
Figure 2:
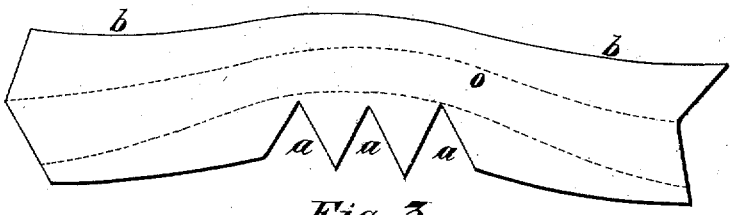
Figure 3:
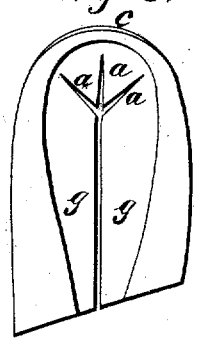

To carry out my invention, I take a single strip of leather, *o*, of suitable length and width, and, after it has been compressed in any manner so as to be as solid as possible, cut a number of niches or a slot, *a*, in its inner edge. The outer edge *b* is then turned inward over the top, so as to form a double thickness, thus giving to all parts liable to be exposed to sight the finish of the grained surface of the leather. Then the central part *c*, which forms the guard for the front of the toe, is turned upward by bending the strip, as shown in Fig. 3. The upper, secured to the insole, is then placed inside of the strip thus bent, and the outer sole *e* pegged to it, securing the parts all together. The strip of leather may be cut long and wide enough, so that, when bent into proper shape, it will not only form the guard around the front of the toe and sides of the upper, but may form a half-sole, *g*, also. The insole, to which the upper is fastened, projecting forward and upward, fills the turned-up guard *c*, so as to support and hold it securely in position. The strip being notched or cut in the center, as shown, the tips are thereby made adjustable, so as to be readily adapted to shoes of several different sizes, all of which they fit equally well.

Having thus described my invention, I claim—

1. A tip for boots or shoes, having a folded edge, substantially as described.
2. A tip for boots and shoes, having a folded edge at the toe, and having a part of its inner edge cut away, whereby it can be bent into shape, substantially as set forth.
3. The leather strip *o*, having the niches *a* cut in its inner edge and bent and folded so as to form the guard or tip *c* and half-sole *g*, substantially as shown and described.

JOHN A. STOCKWELL.

Witnesses:

ISAAC ADAMS, JR.,
C. D. RICHARDSON.